US006283289B1

(12) United States Patent
Rutherford

(10) Patent No.: US 6,283,289 B1
(45) Date of Patent: Sep. 4, 2001

(54) TACKLE BOX WITH HOLDER FOR BEVERAGE CONTAINER

(76) Inventor: William J. Rutherford, 39 Falconer Bay Winnipeg, Manitoba (CA), R2M 4R6

( * ) Notice: Subject to any disclaimer, the term of this patent is extended or adjusted under 35 U.S.C. 154(b) by 0 days.

(21) Appl. No.: 09/590,126

(22) Filed: Jun. 9, 2000

(51) Int. Cl.[7] .................................................... B65D 85/00

(52) U.S. Cl. ..................... 206/315.11; 206/217; 206/564

(58) Field of Search ............................ 206/315.1, 315.11, 206/217, 562, 563, 564; 220/556, 737, 738

(56) References Cited

U.S. PATENT DOCUMENTS 4,218,008 * 8/1980 Veilleux ........................... 229/2.5 R
5,305,544 * 4/1994 Testa, Jr. .............................. 43/54.1
5,503,297 * 4/1996 Frankel ................................ 220/751
5,857,583 * 1/1999 Chantaca et al. .................... 220/564
5,938,023 * 8/1999 Herron et al. .................. 206/315.11

* cited by examiner

*Primary Examiner*—David T. Fidei
(74) *Attorney, Agent, or Firm*—Adrian D. Battison; Michael R. Williams

(57) ABSTRACT

A tackle box has a molded base defining a bottom wall, two upstanding side walls and two upstanding ends walls and an open top with a lid hingedly connected to the top edge for covering the open top in a closed position and movable to an open position to allow access to the hollow interior. A swinging shelf is provided at the open top movable from within the hollow interior to a position to one side to allow stacking of the contents. The base has a portion projecting beyond one end wall so as to provide a generally horizontal surface to one side of the lid with two side by side recesses in the portion shaped and arranged to receive a beverage container such as a can and to support the can against toppling.

10 Claims, 3 Drawing Sheets

FIG. 5
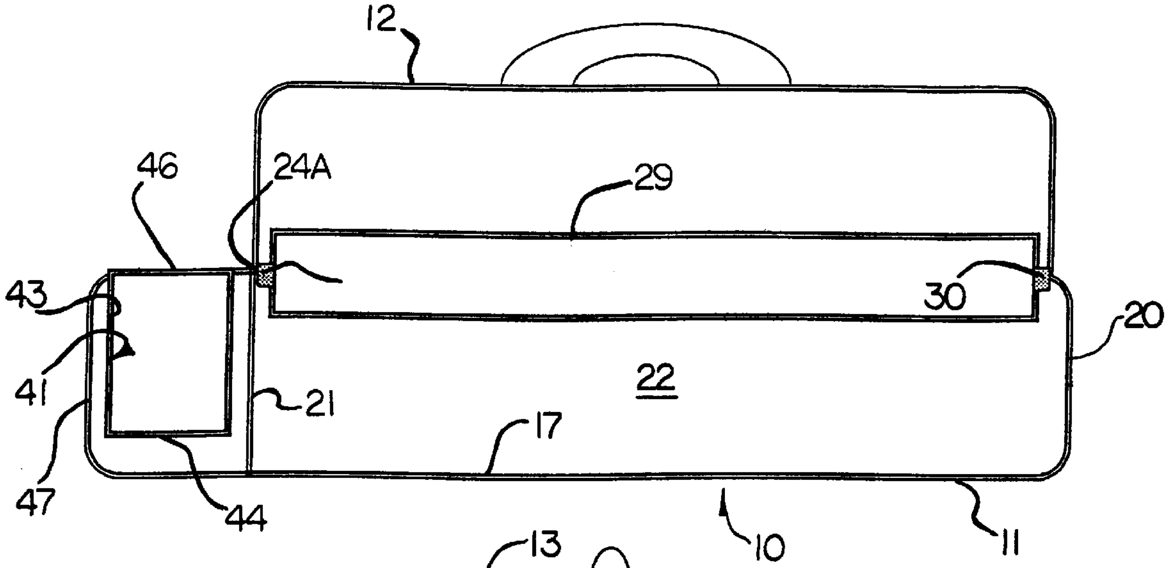
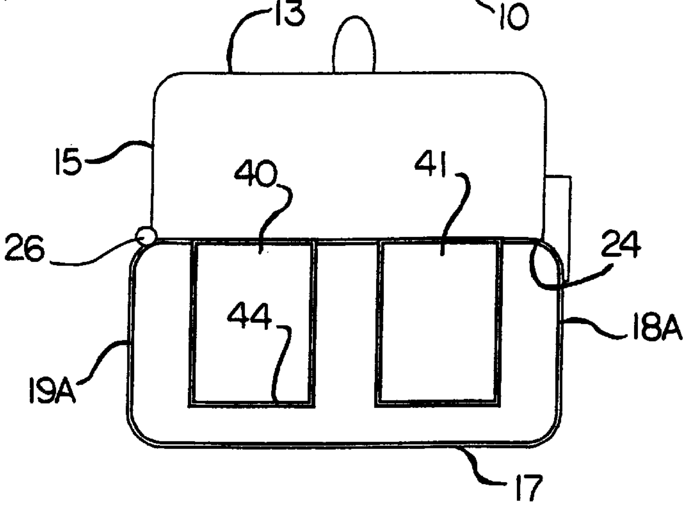
FIG. 6

TACKLE BOX WITH HOLDER FOR BEVERAGE CONTAINER

This invention relates to a tackle box which is made more convenient for the user by the addition of a holder for beverage containers.

BACKGROUND

It is well known that tackle boxes for use by a fisherman or the like include a box with a pivotal lid exposing a hollow interior with one or more swinging shelves which allow storage of small items such as lures and hooks while allowing the shelves to move out of the hollow interior to access the compartments storing the items.

SUMMARY

It is one object of the present invention to provide an improved tackle box which is more convenient for the user.

According to the present invention there is provided tackle box comprising;

a molded base defining a bottom wall, two upstanding side walls and two upstanding ends walls defining a hollow interior, the two side walls and the two end walls forming a peripheral top edge defining an open top of the hollow interior;

a lid hingedly connected to the top edge for covering the open top in a closed position and movable to an open position to allow access to the hollow interior;

a latch for holding the lid closed;

the base having a portion projecting beyond one end wall so as to provide a generally horizontal surface to one side of the lid;

the horizontal surface including at least one recess shaped and arranged to receive and support a beverage container.

Preferably there are two recesses side by side adjacent the end wall.

Preferably the recesses have a base wall at or adjacent the bottom wall of the base.

Preferably the recess has a depth sufficient to prevent toppling of a beverage can.

Preferably the bottom wall projects beyond said one end wall such that the recesses are contained in a portion of the base beyond said one end side wall and where in there is provided an additional side wall parallel to said one end side wall and containing the at least one recess.

Preferably the portion and the base are formed integrally.

Preferably there is provided at least one pivotally mounted shelf carried within the hollow interior and movable from a position within the hollow interior to a position to one side of the open top to expose the contents within the hollow interior below the shelf.

Preferably the portion has side walls integral with the side walls of the base such that the width of the portion is equal to that of the base.

According to a second aspect of the invention there is provided a tackle box comprising; a molded base defining a bottom wall, two upstanding side walls and two upstanding ends walls defining a hollow interior, the two side walls and the two end walls forming a peripheral top edge defining an open top of the hollow interior; a lid hingedly connected to the top edge for covering the open top in a closed position and movable to an open position to allow access to the hollow interior; a latch for holding the lid closed; and at least one recess on the box shaped and arranged to receive and support a beverage container, the at least one recess being arranged beyond one end of the open top.

BRIEF DESCRIPTION OF THE DRAWINGS

In the accompanying drawings, which illustrate an exemplary embodiment of the present invention:

FIG. 5 is a cross sectional view along the lines of 5—5 of FIG. 3.

FIG. 6 is a cross sectional view along the lines 6—6 of FIG. 2.

DETAILED DESCRIPTION

Figure 1:
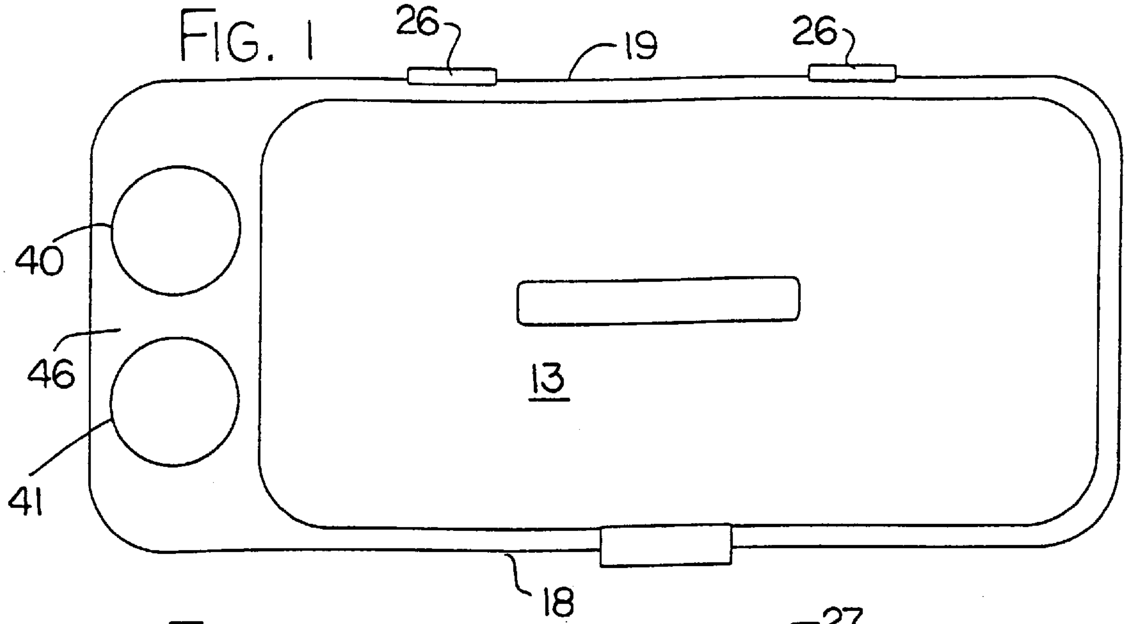
FIG. 1 is a top plan view of the tackle box according to the present invention.
Figure 2:
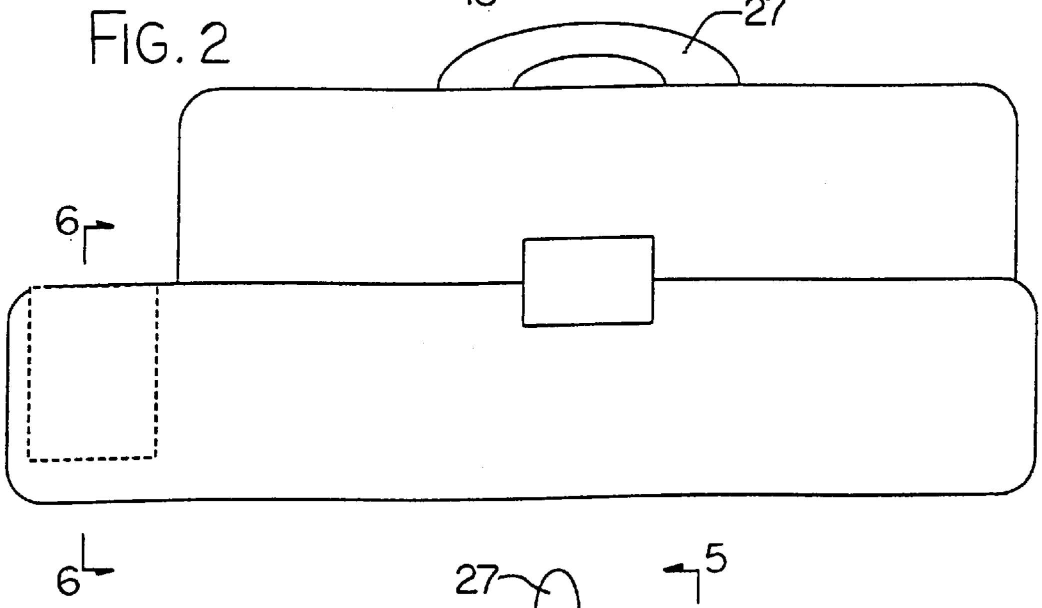
FIG. 2 is a front elevational view of the tackle box of FIG. 1.
Figure 3:
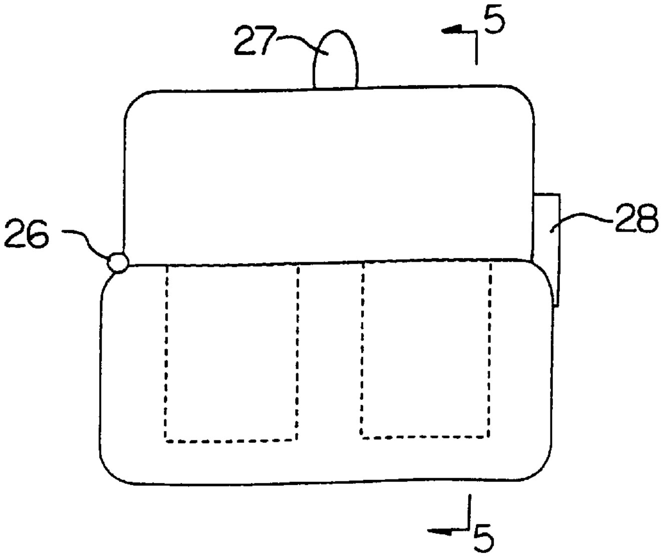
FIG. 3 is a side elevational view of the tackle box of FIG. 1.

A tackle box 10 comprises a base portion 11 and a lid 12. The lid comprises a hollow rectangular body defining a top horizontal wall 13 and four depending side walls 15 which define an open bottom surface 16 with a peripheral lip 16A. The base 11 includes a horizontal bottom wall 17 and four upstanding side walls 18, 19, 20 and 21. The side walls define a hollow interior 22. The side walls 18 and 19 are parallel and longer than the end walls 20 and 21 so as to define a rectangular box with the open top 23 defined by a peripheral edge 24.

The side walls 18, 19 and 20 curve inwardly at their upper edge to define a smooth convex portion 25 defining an attractive appearance with the edge lip 24 thus spaced inwardly from the vertical extent of the side walls. Also the side walls smoothly converge into the base surface 17 to define a rounded box section of attractive appearance without sharp corners which can cause damage. Similarly the lid has smooth curved corners interconnecting with the top surface but the lid extends vertically downwardly so as to sit on the lip 24 but there are no in-turned or curved edges at the bottom of the lid.

Figure 4:
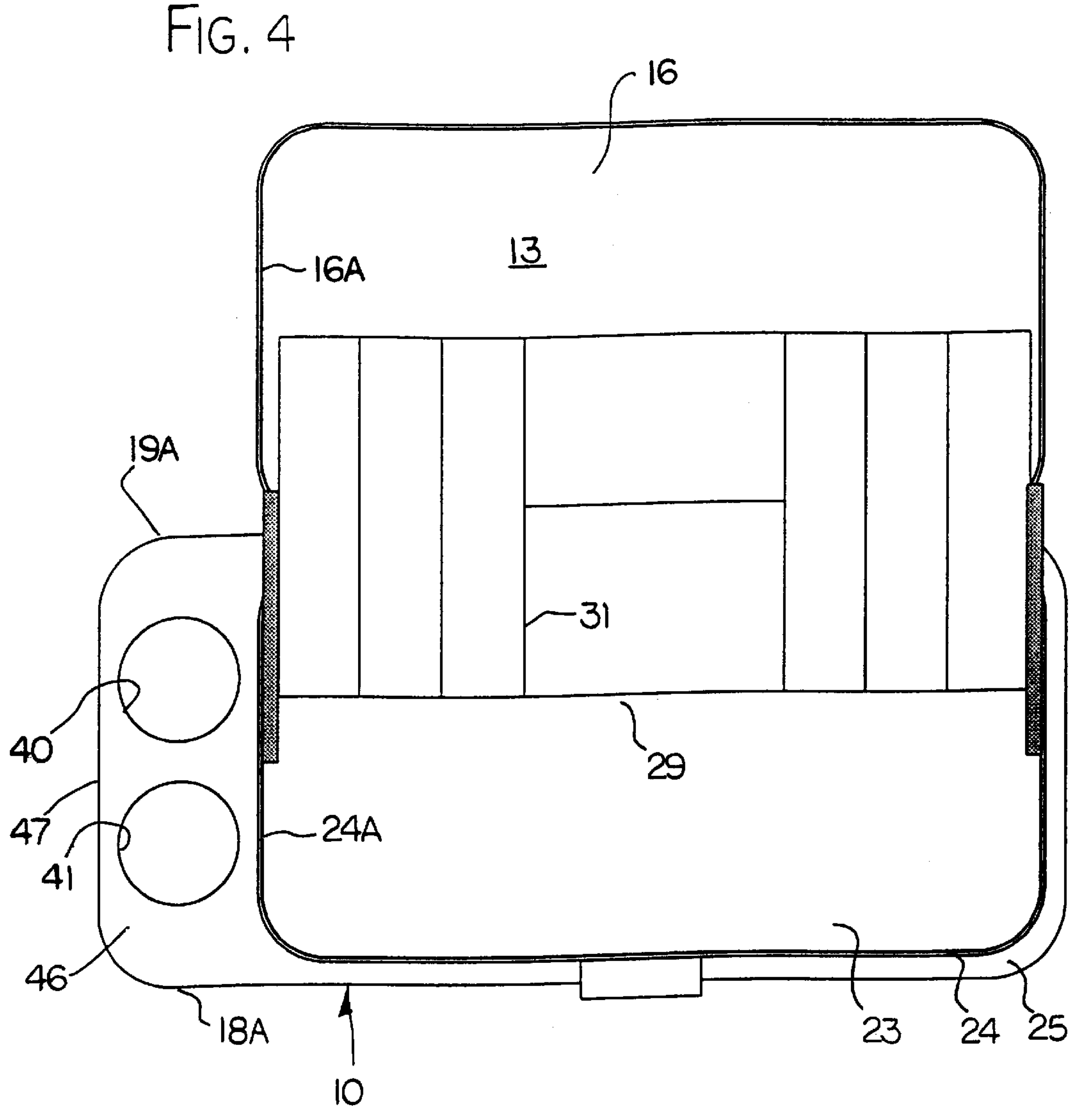
FIG. 4 is a top plan view of the tackle box with the lid open and one of the shelves pivoted to an open position.

The lid is hinged at the top of the side wall 19 by a pair of hinge members 26 so that the lid can pivot about one side wall from a closed position on top of the open top of the base to an inverted open position where the lid extends horizontally out to one side as shown in FIG. 4.

The lid has a handle 27 allowing the lid and the base to be lifted simultaneously to be carried as a portable unit. On the opposite side to the hinge 26 is provided a latch 28 which connects between the side wall 18 and the adjacent side wall of the lid in a latching action with the possibility for a lock (not shown) to hold the lid in the closed position.

The tackle box contains a shelf 29 mounted on pivotal arms 30 allowing the shelf to move from a position directly overlying but within the hollow interior to a position where the shelf is pivoted outwardly to overlie the side wall 19 as shown in FIG. 4. The shelf 29 has a series of compartments 31 for containing and locating small elements for storage within the tackle box. When the shelf is pivoted to one side, this exposes other shelves within the hollow interior or exposes simply compartments of the bottom of the hollow interior where further storage is effected.

The above tackle box is modified by the addition of cylindrical receptacles of recesses 40 and 41 which allow the receipt and storage of a beverage container such as a can or a cup. Each receptacle has a generally cylindrical wall 43 and a base 44 so that the can inserted into the receptacle sits on the base and is confined by the generally cylindrical wall so as to prevent toppling of the can when received in the receptacle. The cylindrical wall may indeed be slightly tapered so that it reduces in diameter toward the base. The cylindrical wall has a height which is sufficient to prevent toppling of a conventional drink can.

The receptacles break out at an open top of each receptacle in a horizontal surface 46 projecting outwardly of the open top of the base beyond the side wall 21. Thus the receptacles are integrally moulded into a portion of the base which extends beyond the side wall 21 and includes a second side wall 47 parallel to the side wall 21 together with extensions of the side walls 18 and 19 to form extension portions 18A and 19A. Thus the receptacles are moulded into the hollow interior of a container defined by the side walls 47 and 21 together with the extension portions 18A and 19A. The base 44 of each of the receptacles is adjacent to the base wall 17. The location of the base 44 spaced upwardly from the bottom wall 17 provides a depth of the receptacle so that a portion of the conventional drink can projects outwardly of the receptacle above the top edge 46 when stored in the receptacle. The surface 46 is smooth and continuous so that it joins the curved portion 25 and thus exposes merely the two openings in an otherwise smoothly curved surface thus providing a clean attractive appearance.

The provision of the receptacle significantly increases the usefulness of the tackle box in that it allows the drinks even when opened to be readily carried by the user into the boat or to a fishing area without the possibility of spillage. The receptacles do not interfere with the normal storage within the container itself and the structure and arrangement of the shelves remains unaffected. The width of the box between the side walls 18 and 19 remains unchanged so that it can be readily and conveniently carried by a user grasping the handle 27. In an alternative arrangement, the wall 21 may be omitted thus providing additional storage space within the base but the opening remains so that it has the edge 24 terminating as indicated at 24A inwardly of the receptacles 40 and 41.

In a further alternative arrangement, the receptacles are moulded as rings in a flange portion which projects outwardly beyond the end wall 21 without the necessity for a base wall underneath the receptacles. This arrangement may not be as attractive but may assist in simplifying the moulding process of the integral structure defining the base and the receptacles.

The bottom of the receptacles may include holes to allow the escape of any collecting moisture or condensation. The handle may be located at a position on the cover which lies on the longitudinal center line but is not at the longitudinal center of the cover and instead is offset toward the end with the receptacles to balance the box with the center of gravity under the handle.

While one embodiment of the present invention has been described in the foregoing, it is to be understood that other embodiments are possible within the scope of the invention. The invention is to be considered limited solely by the scope of the appended claims.

What is claimed is:

1. A fishing tackle box comprising:

a molded base defining a bottom wall, two upstanding side walls and two upstanding ends walls defining a hollow interior, the two side walls and the two end walls forming a peripheral top edge defining an open top of the hollow interior;

a lid hingedly connected to the top edge for covering the open top in a closed position and movable to an open position to allow access to the hollow interior;

a latch for holding the lid closed;

and at least one pivotally mounted shelf carried within the hollow interior and movable from a position within the hollow interior to a position to one side of the open top to expose the contents within the hollow interior below the shelf;

the base having a portion projecting beyond one end wall so as to provide a generally horizontal surface to one side of the lid;

the horizontal surface including at least one recess shaped and arranged to receive and support a beverage container.

2. The fishing tackle box according to claim 1 wherein there are two recesses side by side adjacent the end wall.

3. The fishing tackle box according to claim 1 wherein the at least one recess has a base wall at or adjacent the bottom wall of the base.

4. The fishing tackle box according to claim 1 wherein the at least one recess has a depth sufficient to prevent toppling of a beverage can.

5. The fishing tackle box according to claim 1 wherein the bottom wall projects beyond said one end wall such that the at least one recess is contained in a portion of the base beyond said one end side wall and where in there is provided an additional side wall parallel to said one end side wall and containing the at least one recess.

6. The fishing tackle box according to claim 1 wherein the portion and the base are formed integrally.

7. The fishing tackle box according to claim 1 wherein the portion has side walls integral with the side walls of the base such that the width of the portion is equal to that of the base.

8. A fishing tackle box comprising:

a molded base defining a bottom wall, two upstanding side walls and two upstanding ends walls defining a hollow interior, the two side walls and the two end walls forming a peripheral top edge defining an open top of the hollow interior;

a lid hingedly connected to the top edge for covering the open top in a closed position and movable to an open position to allow access to the hollow interior;

a latch for holding the lid closed;

at least one pivotally mounted shelf carried within the hollow interior and movable from a position within the hollow interior to a position to one side of the open top to expose the contents within the hollow interior below the shelf;

and at least one recess on the box shaped and arranged to receive and support a beverage container, the at least one recess being arranged beyond one end of the open top.

9. The fishing tackle box according to claim 8 wherein there are two recesses side by side.

10. The fishing tackle box according to claim 8 wherein the recess has a depth sufficient to prevent toppling of a beverage can.

* * * * *